United States Patent [19]
Koumoto

[11] Patent Number: 5,278,968
[45] Date of Patent: Jan. 11, 1994

[54] MICROPROCESSOR CAPABLE OF TRANSFERRING DATA WITHOUT INTERMEDIATING EXECUTION UNIT

[75] Inventor: Yasuhiko Koumoto, Tokyo, Japan

[73] Assignee: NEC Corporation, Tokyo, Japan

[21] Appl. No.: 672,527

[22] Filed: Mar. 19, 1991

[30] Foreign Application Priority Data

Mar. 19, 1990 [JP] Japan .................................. 2-70195

[51] Int. Cl.[5] .................. G06F 12/00; G06F 13/00
[52] U.S. Cl. .................. 395/425; 364/DIG. 1; 364/242.3
[58] Field of Search ........ 364/DIG. 1; 242.3; 242.31; 395/425

[56] References Cited
U.S. PATENT DOCUMENTS

| | | | |
|---|---|---|---|
| 4,398,245 | 8/1983 | Fujita | 364/DIG. 1 |
| 4,797,809 | 1/1989 | Sato et al. | 364/DIG. 1 |
| 4,797,853 | 1/1989 | Savage et al. | 364/DIG. 1 |
| 4,912,632 | 3/1990 | Gach et al. | 364/DIG. 1 |

FOREIGN PATENT DOCUMENTS 375883 7/1990 European Pat. Off. .
57-161936 10/1982 Japan .

Primary Examiner—Alyssa H. Bowler
Attorney, Agent, or Firm—Whitham & Marhoefer

[57] ABSTRACT

A microprocessor comprises an execution controller for storing a transfer source address and a transfer destination address and for generating a transfer start signal, and a data controller responding to the transfer start signal so as to continuously and repeatedly perform a storing of a transfer data and a transfer of the stored data to a transfer destination, while inhibiting execution of the execution controller during a period of execution of the data transfer. In addition, a counter circuit is provided to count the number of items of data which have been transferred by the data controller. When the data transfer has been completed, the inhibition of the execution of the execution controller is cancelled, and the transfer source address and the transfer destination address in the execution controller is modified in accordance with the number of items of data counted by the counter circuit.

4 Claims, 4 Drawing Sheets

MICROPROCESSOR CAPABLE OF TRANSFERRING DATA WITHOUT INTERMEDIATING EXECUTION UNIT

BACKGROUND OF THE INVENTION

1. Field of the invention

The present invention relates to a microprocessor, and more specifically to a microprogram-controlled microprocessor capable of executing a block transfer instruction as a macro instruction.

2. Description of related art

A microprogram-controlled microprocessor (abbreviated or simply called "microprocessor" hereinafter) is configured so that a macro instruction which can be programmed by a user is processed by executing a corresponding microprogram, namely a series of microinstructions. Most microprocessors have a macro instruction which requires reading one or two items of data from a memory external to the microprocessor, and executing a designated operation for the read data, and then, writing the result of the operation to the memory external to the microprocessor.

For example, a typical conventional microprocessor includes a data controller for interfacing between the inside of the microprocessor and a data bus external to the microprocessor, and an execution controller for executing a required operation for data fetched from the external data bus. The data controller and the execution controller are coupled to each other through an internal data bus provided in the inside of the mircroprocessor.

The data controller includes first and second read operand registers and one write operand register, and the execution controller includes first and second temporary registers and an arithmetic and logic unit (ALU) for executing an arithmetic and logic operation on the basis of both or one of two items of data stored in the first and second temporary registers.

In operation, data is read from the external data bus and is temporarily held in the first or second read operand register of the data controller, so that two items of data temporarily held in the first and second read operand registers wait for the execution controller to fetch or read. When execution of a microprogram corresponding to a given operation instruction is started, the execution controller causes the first and second temporary registers to fetch the two items of data held in the first and second read operand registers, respectively, so that the ALU executes a designated operation for the two items of data held in the first and second temporary registers and a result of the executed operation is written into the write operand register of the data controller. In the case that the given instruction is a simple transfer instruction, it is not necessary to execute the operation through the intermediary of the ALU. However, the data is, without exception, transferred to the execution controller once and then returned to the data controller.

In the above mentioned conventional microprocessor, an instruction set includes a macro instruction called a "block transfer instruction". This block transfer instruction can be defined to be a macro instruction for transferring contents of continuous memory areas to different continuous memory areas. When the block transfer instruction is used, user is required to designate, as operands, a data transfer source address, information indicating to what extent from the data transfer source address the data should be transferred, namely, how many bytes counting from the data transfer source address should be transferred (this information will be called a "transfer source length" hereinafter), a data transfer destination address, and information indicating to what extent from the data transfer destination address the transfer data is written, namely, how many bytes counting from the data transfer destination address should be written with the transfer data (this information will be called a "transfer destination length" hereinafter). Incidentally, the number of bytes actually transferred in the block transfer instruction corresponds to a minimum value or a smaller one of the transfer source length and the transfer destination length. In addition, when the block transfer has been completed, two values obtained by adding the number of the actually data-transferred bytes to the transfer source length and the transfer destination, respectively, are stored in two predetermined registers.

In the case that the block transfer instruction is executed by a microprogram, the following processing is executed:

When execution of the microprogram is started, data stored in the memory is stored in the first read operand register of the data controller, and then, the block transfer instruction is executed in the following sequence:

Step 1: A transfer source address is set to a transfer source address holding register;

Step 2: A transfer destination address is set to a transfer destination address holding register;

Step 3: A minimum (smaller) value of the transfer source length and the transfer destination address is set to a loop counter;

Step 4: If a content of the loop counter is zero, the microprogram is terminated, and if the content of the loop counter is not zero, the content of the loop counter is decremented by only one;

Step 5: Data of one byte is fetched from the first read operand register and stored in the first temporary register so that a transfer operation is executed;

Step 6: A result of the execution of the transfer operation is written into the write operand register;

Step 7: The content of the transfer source address holding register is incremented by only one (additional operation) in order to designate a memory address to be next read;

Step 8: The content of the transfer destination address holding register is incremented by only one (additional operation) in order to designate a memory address to be next written;

Step 9: It returns to the Step 4,

As seen from the above, when the block transfer instruction is executed by the microprogram in the conventional microprocessor, both of the transfer source address holding register and the transfer destination address holding register have to be updated in each loop. In this case, a processing time per one transfer loop requires six clocks, assuming that each of the above mentioned Steps 4 to 9 can be executed with one clock. Actually, since some of the above mentioned Steps 4 to 9 can be simultaneously executed, the processing time per one transfer loop becomes about four clocks. Here, assume that a width of the data bus of the microprocsssor is four bytes, and the microprocessor has the capability capable of reading or writing one data unit (four byte at maximum) with two clocks.

As seen from the above, when the block transfer instruction is executed by the microprogram in the conventional microprocessor, one byte of data is transferred with four clocks. This means that only one-fourth of a bus transfer capability of the microprocessor is utilized. However, if the bus transfer capability of the microprocessor is utilized at maximum, it should be possible to transfer four bytes of data with four clocks, since four bytes of data can be read with two clocks and four bytes of data can be written with two clocks.

Turning to the steps of the data transfer processing as mentioned above, the data held in the first read operand register of the data controller must have been stored in the first temporary register of the execution controller without exception in the conventional microprocessor. In other words, since the transfer data has been transferred through the intermediary of the execution controller, namely, since the data transfer has been executed by using the microprogram, the number of clocks required for the data transfer of one transfer loop have become a hindrance in the data transfer. In order to obtain the maximum bus transfer capability in the block transfer instruction, it is necessary to complete one transfer loop with one clock. However, it is impossible to realize a one-clock transfer loop inasmuch as the microprogram is used.

SUMMARY OF THE INVENTION

Accordingly, it is an object of the present invention to provide a microprocessor which has overcome the above mentioned defect of the conventional one.

Another object of the present invention is to provide a microprocessor capable of transferring data with the same unit as a bus width of the microprocessor and with a minimum bus cycle of the microprocessor itself.

The above and other objects of the present invention are achieved in accordance with the present invention by a microprocessor comprising execution control means for storing a transfer source address and a transfer destination address and for generating a transfer start signal, data control means responding to the transfer start signal so as to continuously and repeatedly perform a storing of a transfer data and a transfer of the stored data to a transfer destination, while inhibiting execution of the execution control means during a period of the data transfer, means for counting the number of items of data which have been transferred, means for cancelling the inhibition of the execution of the execution control means when the data transfer has been completed, and means for modifying the transfer source address and the transfer destination address in accordance with the number of items of data counted by the counting means until the data transfer has been completed.

The above and other objects, features and advantages of the present invention will be apparent from the following description of preferred embodiments of the invention with reference to the accompanying drawings.

DESCRIPTION OF THE PREFERRED EMBODIMENTS

Figure 1:
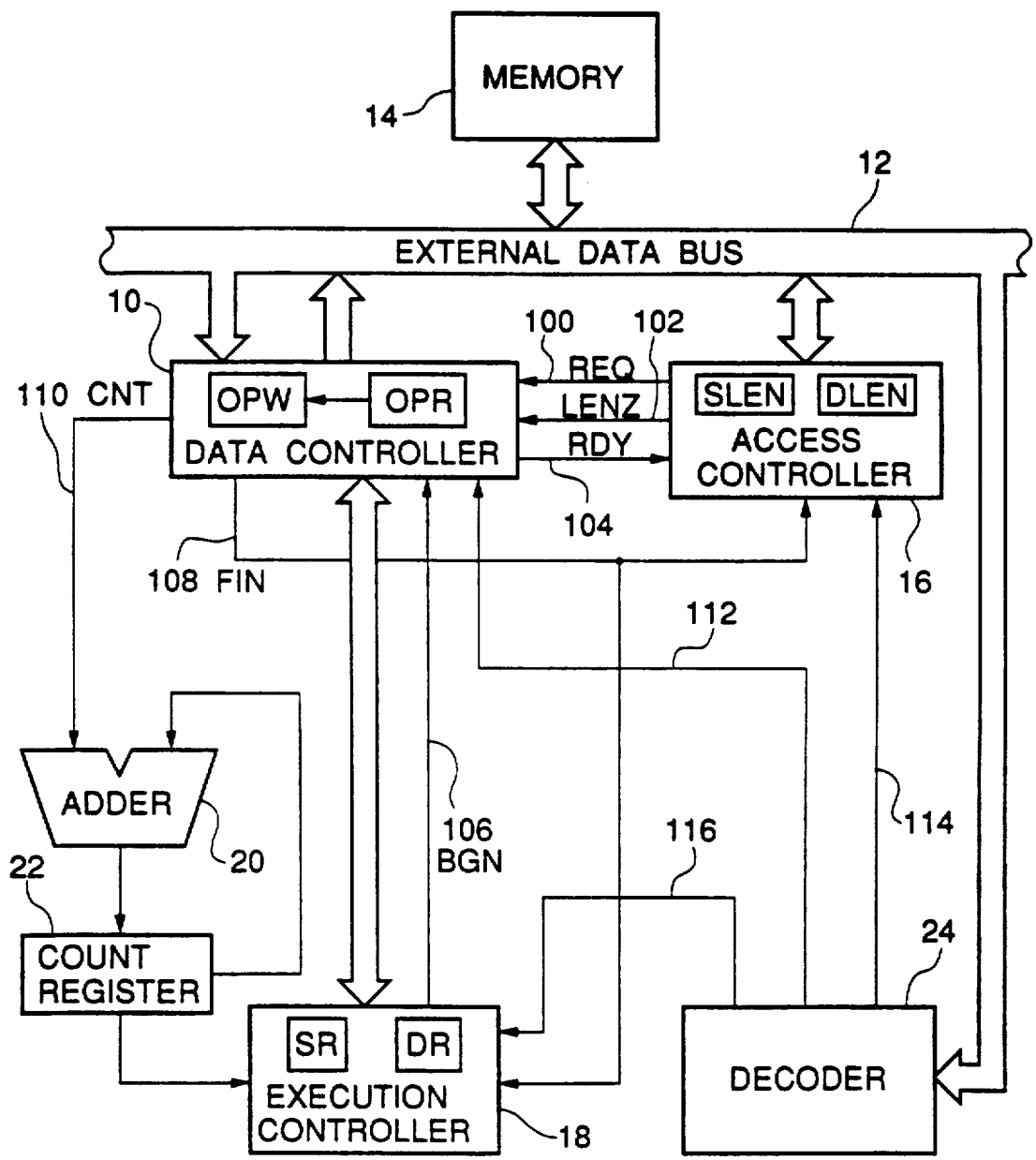
FIG. 1 is a block diagram of a first embodiment of the microprocessor in accordance with the present invention.

Referring to FIG. 1, there is shown a block diagram of a first embodiment of the microprocessor in accordance with the present invention.

The shown microprocessor includes a data controller 10 bidirectionally coupled to an external data bus 12 for interfacing between the inside of the microprocessor and the external data bus 12. For example, this external data bus 12 is directly coupled with an external memory 14. The microprocessor also includes an access controller 16 bidirectionally coupled to the external data bus 12. The access controller 16 outputs to the data controller 10 various information for accessing the external data bus 12. For example, the access controller 16 outputs a data access request signal REQ, 100 and a signal LENZ, 102 indicating that a remaining length of a block transfer is zero, to the data controller 10. On the other hand, the data controller 10 outputs to the access controller 16 a ready signal RDY, 104 indicating that it is ready for transferring data.

In addition, the microprocessor includes an execution controller 18 for outputting a block transfer start signal BGN, 106 to the data controller 10. When the block transfer operation has been completed, the data controller 10 generates an end signal FIN, 108 indicating that the block transfer operation has been completed. This end signal FIN, 108 is supplied to the access controller 16 and the execution controller 18. In addition, the data controller 10 also generates a signal CNT, 110 indicating the number of bytes of data that had been written into the external data bus 12 by the data controller 10. This signal CNT is applied to one input of an adder 20, which in turn has an output connected to a count register 22, which in turn has an output coupled to the other input of the adder 20, so that the count register 22 holds the total number of items of data that had been written into the external data bus 12 by the data controller 10. The output of the count register 22 is connected to the execution controller 18.

The shown microprocessor also includes a decoder 24 coupled to receive an instruction through the external data bus 10 and to decode the received instruction for generating various control signals 112, 114, and 116 to the data controller 10, the access controller 16 and the execution controller 18.

The data controller 10 internally includes a read operand register OPR coupled to the external data bus 12 so as to fetch data on the external data bus 12, and a write operand register OPW directly coupled to the read operand register OPR so as to directly receive data registered in the read operand register OPR. The write operand register OPW is coupled to the external data bus 12 so as to output the data registered in the write operand register OPW to the external data bus 12. The access controller 16 includes therein a transfer source length register SLEN and a transfer destination length register DLEN. Further, the execution controller 18 internally includes a transfer source address holding register SR and a transfer destination address holding register DR.

The microprocessor itself and the shown functional units further include various elements which are well known to persons skilled in the art. However, those elements which do not have a direct relation with the present invention and therefore are not required in understanding the gist of the present invention, will not be shown for simplification of the drawings, and explanation thereof will be omitted for simplification of description.

In the first embodiment shown in FIG. 1, when a block transfer instruction is decoded by the decoder 24 of the microprocessor, a transfer source address, a transfer source length, a transfer destination address and a transfer destination length are sent to and stored in the access controller 16 and the execution controller 104. The processing up to this condition is the same as that performed when a block transfer instruction is executed by only a microprogram.

In the shown embodiment, when the transfer source length and the transfer destination length are registered in the transfer source length register SLEN and the transfer destination length register DLEN of the access controller 16, the access controller 16 checks whether or not the transfer source length and the transfer destination length are zero. If neither the transfer source length nor the transfer destination length is zero, and if the ready signal RDY, 104 is active to indicate that it is ready for transferring data, the access controller 16 decrements the transfer source length and the transfer destination length (respectively held in the transfer source length register SLEN and the transfer destination length register DLEN of the access controller 16) by only one, and activates the data access request signal REQ, 100 so as to cause data to be read from the external data bus 12. In response to the data access request signal REQ, 100, the data controller 10 fetches data which is outputted onto the external data bus 12 from a location of the memory 14 designated by an address counter or register not shown which indicates the transfer source address, and then stores the fetched data on the read operand register OPR. In this condition, the data controller 10 waits for the start signal BGN, 106 to be activated.

In response to the active start signal BGN, 106, the data controller 10 brings the operand read register OPR and the operand write register OPW into a condition in which the data held in the operand read register OPR is continuously transferred to the operand write register OPW without intermediary of the execution controller 18, so that the block transfer can be realized. In the way of the execution of this block transfer, the data controller 10 activates the ready signal RDY, 104 at each time that the read operand register OPR becomes empty and as soon as the read operand register OPR becomes empty, so that it is notified to the access controller 16 that it is ready for fetching next data. Namely, the data controller 10 waits the data access request signal REQ, 100 from the access controller 16 at each time that the read operand register OPR becomes empty. At this time, the data controller 10 also operates to transfer the data stored in the write operand register OPW to a location of the memory 14 designated by an address counter or register not shown indicating the transfer destination address.

The access controller 16 decrements the transfer source address and the transfer destination length by only one, again, and on the other hand, the transfer source address and the transfer destination address of the not-shown address counters or registers are incremented so as to indicate addresses to be next read and written, respectively. At the same time, the access controller 16 activates the data access request signal REQ, 100, so that the above mentioned data transfer is repeated, again. Thus, the above mentioned operation is repeated until all of the data has been transferred.

When all of the data has been transferred, namely when the remaining length signal LENZ, 102 of the access controller 16 is activated so as to indicate that either the transfer source length or the transfer destination length becomes zero, the data controller 10 activates the end signal FIN, 108 so as to inform the access controller 16 and the execution controller 18 that the block transfer has been completed.

In the above mentioned data transfer, the block transfer of the data stored in the write operand register OPW of the data controller 10 to the memory is performed in units of bus cycle. Namely, assuming that the bus width of the external data bus 12 is four bytes, the block transfer is performed in units of four bytes.

In the course of execution of the block transfer, at each time that the data is written from the write operand register OPW to the external data bus 12, the data controller 10 outputs the number of effective bytes of written data as the signal CNT, 110. This signal CNT, 110 is added with the value of the count register 22 by the adder 20. Assuming that the bus width of the external data bus 12 is four bytes, the value indicated by the signal CNT, 110 is four in the way of the block transfer, but takes any value within a range of 1 to 3, dependently upon the transfer destination address and the transfer destination length, as regards the first transferred data and the last transferred data.

Figure 2:
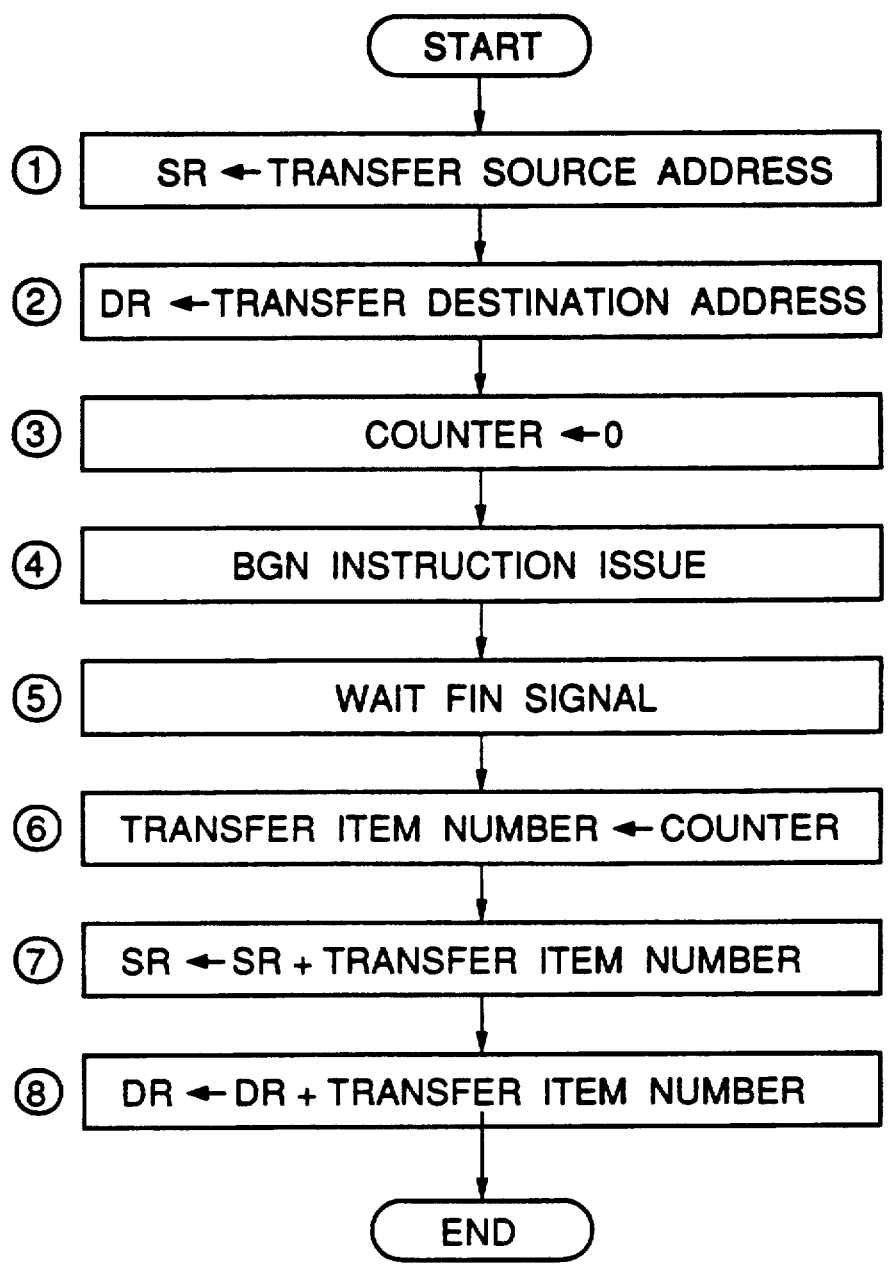
FIG. 2 is a flow chart illustrating a processing of a microprogram executed in the microprocessor shown in FIG. 1.

An operation of the data controller 10 has been explained. Now, an operation of the execution controller 18 will be explained. The execution controller 18 of the shown embodiment does not perform the processing for the storing and the transfer of data, differently from the conventional microprocessor. Namely, the execution controller 18 controls the data controller 10 and manages and controls the transfer source address and the transfer destination address, by means of a microprogram having a processing flow shown in FIG. 2. As illustrated in FIG. 2, the block transfer is executed as follow:

Step 1: A transfer source address is set to the transfer source address holding register SR;

Step 2: A transfer destination address is set to the transfer destination address holding register DR;

Step 3: The content of the count register 22 is set to zero by a microinstruction;

Step 4: The start signal BGN, 106 is activated by a microinstruction so as to instruct the data controller to start the block transfer;

Step 5: Execution of a next step of the microprogram is stopped until the end signal FIN, 108 is activated;

Step 6: The content of the count register 22 is read when the end signal FIN, 108 is activated;

Step 7 The content of the count register 22 is added to the content of the transfer source address holding register SR;

Step 8: The content of the count register 22 is added to the content of the transfer destination address holding register DR.

As seen from the above, the first embodiment of the present invention is such that the transfer data is transferred from the read operand register OPR directly to the write operand register OPW and then to the external data bus without intermediary of the execution controller. Namely, it is possible to transfer the data in same units as the bus width.

In general, when the block transfer instruction is executed, a large amount of data is transferred, and therefore, a number of clocks are required for the large amount of data transfer. If an interrupt request generated from a device external to the microprocessor is masked in the course of execution of the block transfer instruction which needs a number of clocks, a real time processing performance of the microprocessor will decrease. Therefore, it is a general practice that the block transfer can be interrupted in response to an interrupt request from an external device.

The first embodiment is configured that the transfer source address holding register SR and the transfer destination address holding register DR (which respectively hold the transfer source address and the transfer destination address) are respectively modified by the number of bytes of the actually transferred data in accordance with a microprogram when execution of the block transfer instruction has been completed. These modified values of the transfer source address holding register SR and the transfer destination address holding register DR can be used as a transfer restarting address when the block transfer instruction interrupted in response to the interrupt request from the external device is restarted. A second embodiment described hereinafter has a function of interrupting the block transfer in response to the interrupt request from the external device.

Figure 3:
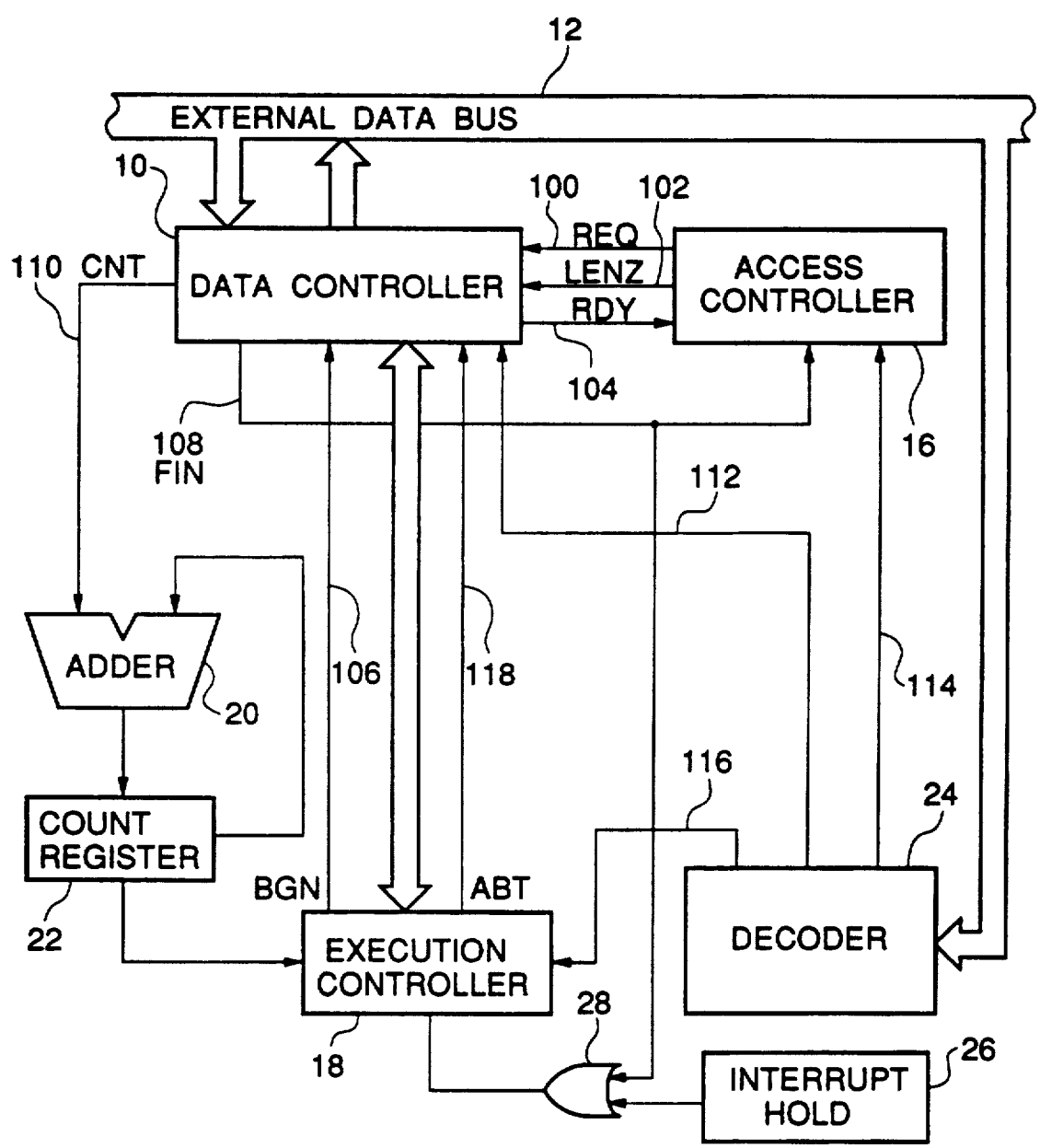
FIG. 3 is a block diagram of a second embodiment of the microprocessor in accordance with the present invention.

Now, referring to FIG. 3, there is shown a block diagram of the second embodiment of the microprocessor in accordance with the present invention. In FIG. 3, elements corresponding to those shown in FIG. 1 are given the same Reference Numerals, and explanation thereof will be omitted.

As seen from comparison between FIGS. 1 and 3, the second embodiment additionally includes an interrupt request hold mechanism (composed of for example, a flag) 26 for receiving and holding an interrupt request from an external device, and an OR gate 28 having a first input connected to an output of the interrupt request hold mechanism 26 and a second input connected to receive the end signal FIN, 108. An output of the OR gate 28 is connected to the execution controller 18. In addition, the execution controller 18 outputs an interrupt request signal ABT, 118 to the data controller 10.

In the first embodiment as mentioned hereinbefore, during a period in which the data controller 10 is in a condition of executing the block transfer, the execution of the microprogram is stopped. The cancellation of the execution stop of the microprogram is effected by only the end signal FIN, 108 which is generated when the block transfer has been completed. In the second embodiment, the cancellation of the execution stop of the microprogram is effected by a logical sum between the end signal FIN, 108 and the output of the interrupt request hold mechanism 26. On the other hand, the microprogram used in the second embodiment has a microinstruction for discriminating whether the cancellation of the execution stop of the microprogram is required by the end signal FIN, 108 from the data controller 10 or the interrupt request from the external device. If the cancel of the stop of the execution of the microprogram is required by the interrupt request from the external device, the execution controller 18 generates the interrupt request signal ABT, 118 to the data controller 10 in order to request the interrupt of the block transfer. Thereafter, the execution controller waits the end signal FIN, 108 indicating that the block transfer has been interrupted. At the time when the end signal FIN, 108 is generated, the content of the count register 22 has been settled. Therefore, similarly to the first embodiment, the transfer source address holding register SR and the transfer destination address holding register DR are respectively modified by the number of bytes of the actually transferred data in accordance with the microprogram.

Figure 4:
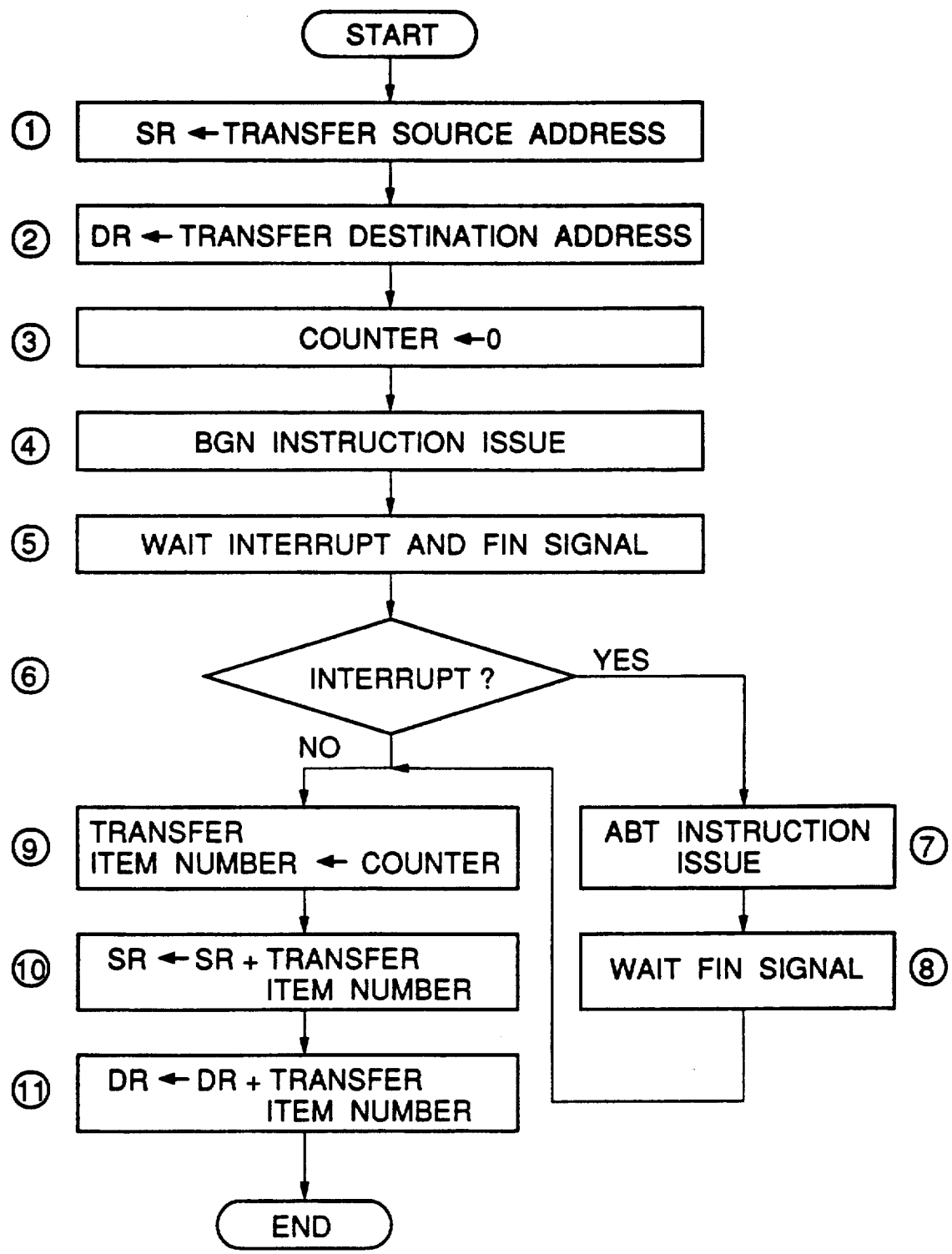
FIG. 4 is a flow chart illustrating a processing of a microprogram executed in the microprocessor shown in FIG. 3.

Turning to FIG. 4, there is shown a flow chart illustrating a processing executed in the microprocessor shown in FIG. 3.

Namely, the execution controller 18 controls the data controller 10 and manages and controls the transfer source address and the transfer destination address, by means of a microprogram as follows:

Step 1: A transfer source address is set to the transfer source address holding register SR;

Step 2: A transfer destination address is set to the transfer destination address holding register DR;

Step 3: The content of the count register 22 is set to zero by a microinstruction;

Step 4: The start signal BGN, 106 is activated by a microinstruction so as to instruct the data controller to start the block transfer;

Step 5: The interrupt request and the end signal FIN, 108 are monitored;

Step 6: When the interrupt request is detected, the processing goes to Step 7, and when the interrupt request is not detected but the end signal FIN is detected, the processing goes to Step 9;

Step 7: The interrupt request signal ABT, 118 is activated by a microinstruction;

Step 8: The end signal FIN, 108 is waited;

Step 9: The content of the count register 22 is read when the end signal FIN, 108 is activated;

Step 10: The content of the count register 22 is added to the content of the transfer source address holding register SR;

Step 11: The content of the count register 22 is added to the content of the transfer destination address holding register DR.

As seen from the above, the microprocessor in accordance with the present invention is characterized in that a data transfer portion of all the processing required for realizing the block transfer is executed by only the data controller without intermediary of the execution controller, differently from the conventional microprocessor in which all the processing required for realizing the block transfer is executed by only the microprogram. Therefore, the microprocessor in accordance with the present invention can execute the block transfer by utilizing the bus transfer capability of the microprocessor to a maximum extent.

In addition, the interrupt function for interrupting the block transfer can be realized by adding a simple circuit.

The invention has thus been shown and described with reference to the specific embodiments. However, it should be noted that the present invention is in no way limited to the details of the illustrated structures but changes and modifications may be made within the scope of the appended claims.

I claim:

1. A microprogram-controlled microprocessor comprising:
   an execution controller for generating a block transfer start signal when a decoder decodes a block transfer instruction, said execution controller being brought into a condition of being inhibited from executing a microprogram when said block transfer start signal is generated;

a data controller having a read operand register coupled to an external data bus so as to fetch data on said external data bus, and a write operand register coupled to said external data bus so as to output data stored in the write operand register to said external bus, said data controller being controlled by said block transfer start signal so that said write operand register is directly coupled to said read operand register so as to directly receive data registered in said read operand register without intermediating said execution controller, said data controller generating a ready signal at each time that said read operand register becomes empty; and an access controller having a transfer source length register and a transfer destination length register which are respectively set with a transfer source length and a transfer destination length when said decoder decodes said block transfer instruction, said transfer source length register and said transfer destination length register being decremented at each time that data is transferred through said read operand register and said write operand register, said access controller generating an access request signal when neither said transfer source length register nor said transfer destination length register is zero and when said ready signal is active, so that if said data controller receives said access request signal when said ready signal is active, said data controller causes said read operand register to fetch data on said external data bus so that the data fetched in said read operand register is transferred to said write operand register, and when said ready signal is active but said access request signal has not yet been activated, said data controller causes said write operand register to transfer the data fetched in said write operand register to said external data bus, whereby data is continuously and repeatedly transferred through said read operand register and said write operand register without intermediating said execution controller.

2. A microprocessor claimed in claim 1 wherein said access controller also generates an zero-length signal when either said transfer source length register or said transfer destination length register becomes zero, and said data controller responds to said zero-length signal to generate an end signal to said execution controller so as to cancel the inhibition of the execution of the microprogram of said execution controller.

3. A microprocessor claimed in claim 2 wherein said execution controller has a transfer source address register and a transfer destination address register, and further including means for counting the number of items of data which have been transferred, so that when said end signal is generated, said execution controller modifies said transfer source address register and said transfer destination address register in accordance with a count value of said counting means.

4. A microprocessor claimed in claim 2 further including a holding mechanism for holding an interrupt signal from an external device and an OR gate for receiving said end signal and an output of said holding mechanism so as to supply a logical sum of said end signal and said output of said holding mechanism to said execution controller, so that when said logical sum is active, the inhibition of the execution of said execution controller is cancelled.

* * * * *